H. S. Shepardson,
Padlock.
No. 102,440.      Patented Apr. 26, 1870.
Fig. 1.
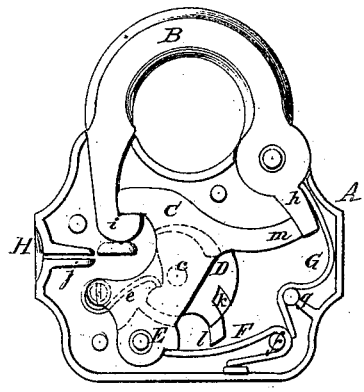
Fig. 4.     Fig. 2.
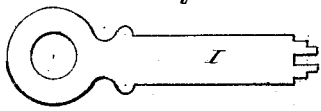
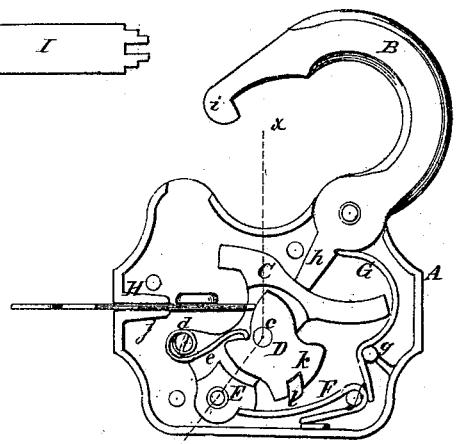
Fig. 3.
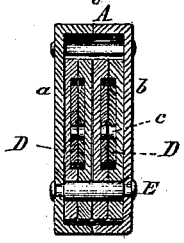
Witnesses,
L. Hailer.
Phil. T. Dodge.
Inventor,
H. S. Shepardson.
by Dodge & Munn
his attys.

United States Patent Office.

HIRAM S. SHEPARDSON, OF SHELBURNE FALLS, MASSACHUSETTS.

Letters Patent No. 102,440, dated April 26, 1870.

IMPROVEMENT IN PADLOCKS.

The Schedule referred to in these Letters Patent and making part of the same.

*To all whom it may concern:*

Be it known that I, HIRAM S. SHEPARDSON, of Shelburne Falls, in the county of Franklin and State of Massachusetts, have invented certain Improvements in Padlocks, of which the following is a specification, reference being had to the accompanying drawings.

My invention relates to padlocks, and the invention consists in a novel construction and arrangement of a swinging locking-dog, when the dog is arranged to lock the hasp at both ends, with one or more tumblers pivoted thereon, in combination with a fixed or stationary stop, as hereinafter explained.

In the drawings—

Figure 1 is a plan view of the interior of the lock, with one-half of its case removed.

Figure 2 is a plan view of the same, with one of the dogs, and a tumbler attached, removed.

Figure 3 is a transverse section on the line $x$–$x$ of fig. 2, and

Figure 4 is a plan view of the key.

In constructing my lock I make a case, A, in two parts or halves, $a$ and $b$, as shown in fig. 3, or in any other convenient manner, and of any desired size and shape, and within this case, and on the same pin, E, mount a series of swinging locking-dogs, C, with a tumbler, D, loosely attached in a recess to each, as shown in figs. 1 and 2.

The form of the tumblers is shown in fig. 2, and that of the dogs in fig. 1, its recessed side being shown in fig. 2.

This recess corresponds in depth with the thickness of one of the tumblers, D, and is so shaped as to allow the tumbler, when mounted on a pin, $c$, to turn freely therein, and, also, to allow a spring, $e$, connected to one of the arms of the dog, to have its fore end bear against a shoulder or projection of the tumbler, all as clearly shown in fig. 2, and in dotted lines in fig. 1.

When the tumbler and dog are thus connected, and the dog mounted on the pin E, it will be seen that the tumbler turns on the pin $c$, and the whole swings on the pin E.

It is obvious that there may be any number of dogs C, with tumblers D attached, mounted on the pin E. In the drawings there are four, and these are arranged as clearly shown in fig. 3.

In the lower part of the case is placed, upon a pin, $f$, a series of springs, F, formed and shaped as shown in fig. 2, and corresponding in number with the dogs C, each spring being arranged so as to have its longest arm bear against a shoulder of a corresponding dog, as shown in the same figure, and its shortest arm against the side of the case, or a projection connected to it, as shown in said fig. 2.

In the rear side of the case is arranged another seat-spring, G, with one end resting against that portion of the springs F which turns around the pin $f$, and the other bearing against the back side of the end $h$ of the hasp B, which extends into the case, the pin $g$, forming the support or fulcrum of the spring, as shown in figs. 1 and 2.

The form and arrangement of the hasp B is clearly shown in figs. 1 and 2. It has a hook or catch, $i$, on its front end, and a projection, $h$, extending down into the case from the point where it is hinged, and is locked in position by the dogs C, as shown in fig. 1, as hereinafter explained.

In the front edge or side of the case is a narrow oblong rectangular key-hole, H, with guides, $j$, projecting inward from, and forming a part of the case, as shown in both of said figs. 1 and 2, and through which a flat key, I, is inserted. The form of the end of this key depends upon the shape, thickness, and relative position of the dogs and tumblers, it being notched and recessed so as to force the tumblers and the dogs into the position required for producing the result desired, as hereinafter explained, it being obvious that, with every change in the breadth, thickness, or relative position of the tumblers and dogs, there would have to be a corresponding change in the form of the end of the key.

The lock shown in the drawings has four locking-dogs, with a tumbler connected to each, and these are mounted and arranged relatively on the pin E, as shown in fig. 3.

The key I has its end notched and recessed to correspond with this arrangement, so that the shoulders of its outer notches and of its recess will bear against the dogs, while its extreme ends and the shoulders of its inner notches will bear against the tumblers.

The lock thus constructed will be operated as follows:

When locked the parts are all in position, as shown in fig. 1, in which, it will be seen, the pin ends of the swinging locking-dogs C extend between both ends of the hasp B, and hold it securely in position, while the spring G is pressing against its rear end $h$, to throw up its front end as soon as it is relieved, and that the springs F and $e$ are, at the same time, pressing the dogs C and the tumblers D forward, respectively, and, also, that the hasp can only be released by pressing back the tumblers and dogs.

For this purpose the key I is inserted, and when inserted and pushed forward its extreme ends and inner notches first swing the tumblers until their gates $k$ are formed in line in front of the stop $l$, then the outer notches and the bottom of the recess of the key bear against the locking-dogs C, when they are swung back, the stop $l$ entering the gates $k$, and thus permitting this movement, and, as they are swung back, the hasp B is released, as shown in fig. 2, and its end *h* holds the dogs in position, as shown in the same figure.

To close the lock it is only necessary to force the hasp back to its original position, for it will be noticed as its free end is forced down its opposite end *h* slips over the end of the dogs C just at the proper time for the springs F to carry these dogs into the position shown in fig. 1.

I am aware that a swinging locking-dog, having tumblers pivoted thereon, has heretofore been used in connection with a stop, and, therefore, I do not claim broadly the combination of these devices, but Having described the peculiar features of my invention,

What I claim is—

A padlock having one or more swinging locking-dogs so constructed and arranged as to lock the hasp at both sides, when said dogs have rotating tumblers pivoted in recesses in their sides, and are arranged to operate in connection with the stationary stop *l*, substantially as herein described.

H. S. SHEPARDSON.

Witnesses:
 PHIL. T. DODGE,
 H. B. MUNN.